(12) United States Patent
Wheeler

(10) Patent No.: US 11,738,420 B2
(45) Date of Patent: Aug. 29, 2023

(54) ROUTER GUIDE

(71) Applicant: Dawn Wheeler, Rockwall, TX (US)

(72) Inventor: Dawn Wheeler, Rockwall, TX (US)

( * ) Notice: Subject to any disclaimer, the term of this patent is extended or adjusted under 35 U.S.C. 154(b) by 0 days.

(21) Appl. No.: 17/336,820

(22) Filed: Jun. 2, 2021

(65) Prior Publication Data
US 2021/0379720 A1  Dec. 9, 2021

Related U.S. Application Data

(60) Provisional application No. 63/035,633, filed on Jun. 5, 2020.

(51) Int. Cl.
*B23Q 17/22* (2006.01)
*B27C 5/10* (2006.01)

(52) U.S. Cl.
CPC ............ *B23Q 17/2233* (2013.01); *B27C 5/10* (2013.01); *B23Q 2717/006* (2013.01)

(58) Field of Classification Search
CPC ...... B27C 5/10; B27F 1/08; B27F 1/10; B27F 1/12; B27F 1/16; B27F 5/00; B27F 5/02; B23Q 9/0007; B23Q 9/0014; B23Q 9/0042; B23Q 9/0064; B23Q 9/0078
See application file for complete search history.

(56) References Cited

U.S. PATENT DOCUMENTS

| | | | |
|---|---|---|---|
| 3,217,393 A | 11/1965 | Johnson | |
| 4,827,625 A | 5/1989 | Moal | |
| 5,052,454 A * | 10/1991 | Meinhardt | B23Q 9/0078 144/144.51 |
| 5,285,831 A * | 2/1994 | Woolgar | B27F 5/026 144/48.6 |
| 5,318,082 A * | 6/1994 | Von Hollen | B27F 1/12 144/144.1 |
| 5,383,503 A * | 1/1995 | Johnson | B23Q 35/102 409/110 |
| 5,647,420 A * | 7/1997 | Michell | B25H 1/005 144/286.5 |
| 5,893,402 A | 4/1999 | Darling | |
| 6,450,220 B2 | 9/2002 | Domask | |
| 7,610,839 B1 * | 11/2009 | Bessette | B23Q 9/0014 30/375 |
| 7,819,145 B1 * | 10/2010 | Vice | B23Q 9/0042 144/144.1 |
| 9,802,333 B1 * | 10/2017 | Krohmer | G09F 7/00 |
| 2005/0109181 A1 | 5/2005 | Zawadzki et al. | |

* cited by examiner

*Primary Examiner* — Matthew Katcoff
(74) *Attorney, Agent, or Firm* — Boudwin Intellectual Property; Daniel Boudwin

(57) ABSTRACT

A router guide is provided. The device includes a planar body having a first elongated opening and a second elongated opening therethrough. The first elongated opening intersects the second elongated opening perpendicularly. A circular opening having a diameter greater than the first and second openings, wherein the circular opening is disposed through the planar body at an intersection of the first and second elongated openings, such that the circular opening is dimensioned to receive a router bit therethrough. In some embodiments, a plurality of apertures is disposed through the planar body, wherein the plurality of apertures is disposed in a pair of colinear rows disposed parallel to each lateral edge of the planar body.

19 Claims, 4 Drawing Sheets

ROUTER GUIDE

CROSS REFERENCE TO RELATED APPLICATIONS

This application claims the benefit of U.S. Provisional Application No. 63/035,633 filed on Jun. 5, 2020. The above identified patent application is herein incorporated by reference in its entirety to provide continuity of disclosure.

BACKGROUND OF THE INVENTION

The present invention relates to a router guide. More particularly, the present invention pertains to a router guide that allows a user to precisely position a router bit along a board, trim, or other object with either a handheld or table router.

Many individuals enjoy woodworking and making modifications to a home, either personally or professionally. For example, individuals may wish to embellish trim or cabinetry with decorative patterns or rounded and beveled edges. Furthermore, a user may wish to install trim, baseboards, door frames, chair railings, crown moldings, window frames, windowsills, stairs, or other objects within the home or business. Alternatively, a user may wish to hollow out a portion of wood to create a depressed interior, such as with cabinet doors, to achieve a desired look. In order to perform these modifications, a router must often be used. However, it can be difficult, particularly for amateurs, to ensure the router cuts a in a precise straight line. Particularly, in uses where the router bit is not directly along an edge of the material, ensuring straight cuts is even more difficult. Users are often forced to rely on estimates during use, which can result in uneven or curved cuts. In many cases, the wood panel or trim may be irrevocably damaged, requiring expensive replacement materials. Some router devices include a built-in guide; however, such guides are often impossible to use unless the user is cutting along an edge of the material. Additionally, such routers fail to provide a means of adjusting the distance of the router from the guide along independent axes, thereby ensuring maximum precision in cuts made with the associated router bit. Therefore, a device that can allow a user to make precise straight cuts with either a handheld or table router is desired.

In light of the devices disclosed in the known art, it is submitted that the present invention substantially diverges in design elements from the known art and consequently it is clear that there is a need in the art for an improvement to existing router guides. In this regard, the instant invention substantially fulfills these needs.

SUMMARY OF THE INVENTION

In view of the foregoing disadvantages inherent in the known types of router guides now present in the known art, the present invention provides a router guide wherein the same can be utilized for providing convenience for the user when positioning a router bit along a desired board or piece of trim during use of a handheld or table router.

The present system comprises a planar body having a first elongated opening and a second elongated opening therethrough. The first elongated opening perpendicularly intersects the second elongated opening. A circular opening having a diameter greater than a width of each of the first and second elongated openings, wherein the circular opening is disposed through the planar body at an intersection of the first and second elongated openings. The circular opening is dimensioned to receive a router bit therethrough. In some embodiments, a plurality of apertures disposed through the planar body, wherein the plurality of apertures comprises a pair of colinear rows of apertures disposed parallel to each lateral edge of the planar body.

In some embodiments, the second elongated opening intersects the first elongated opening at a midpoint thereof. In another embodiment, the first and second elongated openings are disposed centrally along the planar body. In other embodiments, a guide bar is affixed to a first side of the planar body, wherein the guide bar extends parallel to the first elongated opening. In yet another embodiment, a plurality of measurement indicia is disposed on each of an upper edge, a lower edge, and each lateral edge of the planar body. In some embodiments, the plurality of measurement indicia extends along the upper and lower edge along a length of the first elongated opening. In another embodiment, the plurality of measurement indicia is etched into the planar body. In other embodiments, a length of the first elongated opening is double a length of the second elongated opening. In yet another embodiment, the first elongated opening is disposed parallel to an upper edge of the planar body. In some embodiments, the plurality of apertures is disposed at regular intervals.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
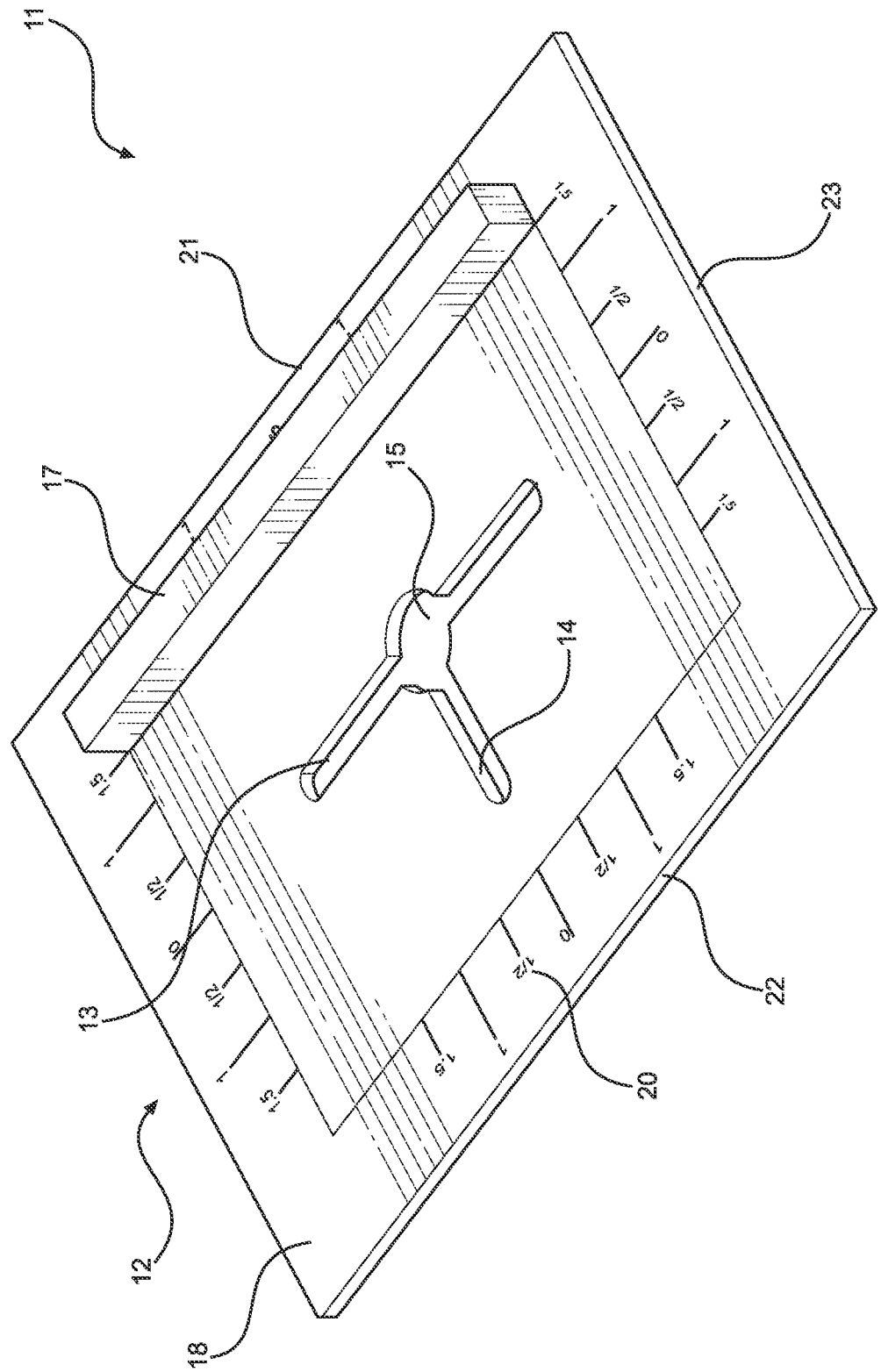
FIG. 1A shows an upper perspective view of an embodiment of the router guide.

Reference is made herein to the attached drawings. Like reference numerals are used throughout the drawings to depict like or similar elements of the router guide. The figures are intended for representative purposes only and should not be considered to be limiting in any respect.

Figure 1B:
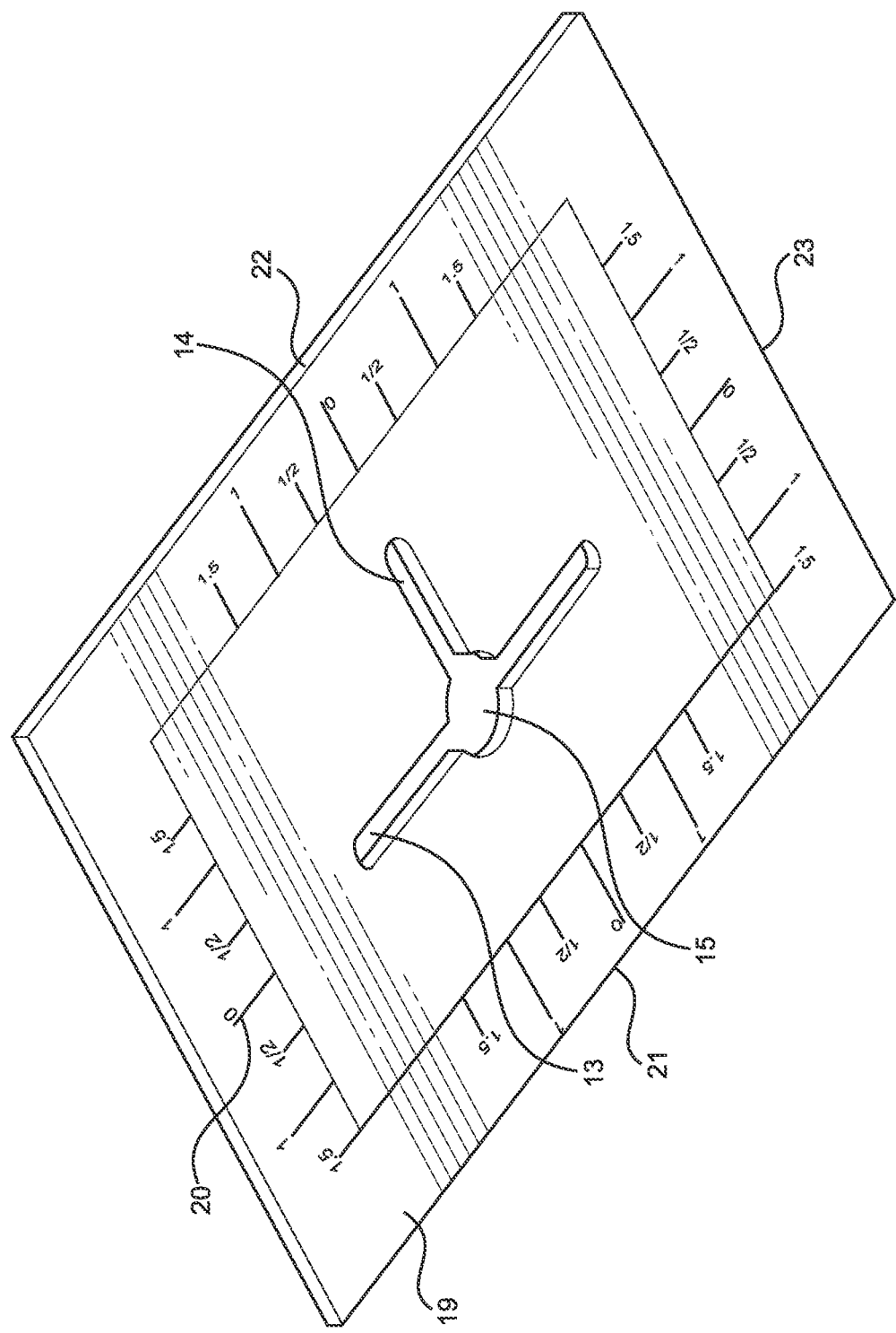
FIG. 1B shows a lower perspective view of an embodiment of the router guide.
Figure 3:
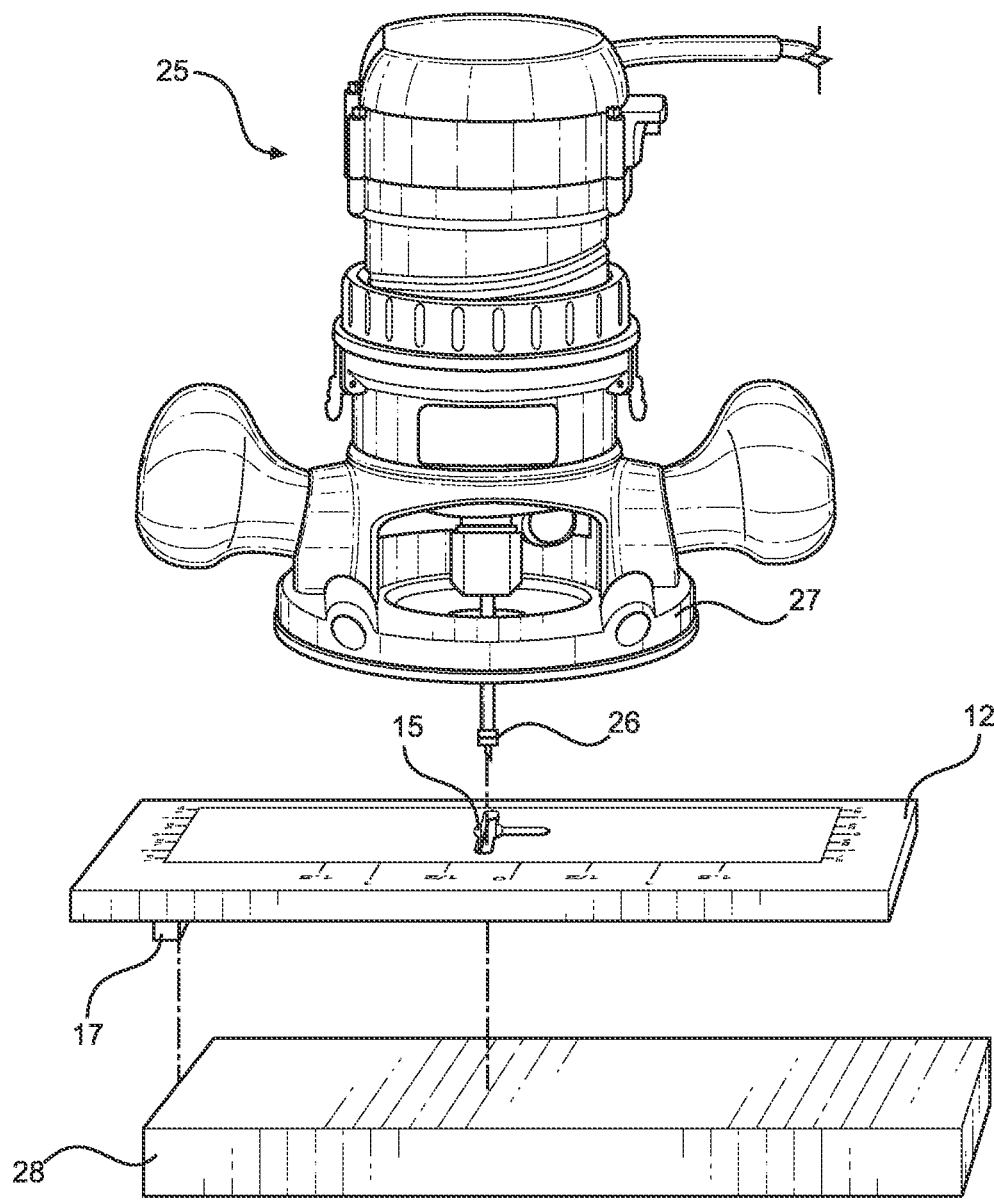
FIG. 3 shows an exploded view of an embodiment of the router guide in use.

Referring now to FIGS. 1A and 1B, there is shown an upper perspective view of an embodiment of the router guide and a lower perspective view of an embodiment of the router guide, respectively. The router guide 11 comprises a planar body 12 having an upper edge 21, a lower edge 22, and a pair of lateral edges 23. The planar body 12 is contemplated to comprise a metallic material having sufficient weight to stabilize the planar body 12 on a cutting surface during use. In the shown embodiments, each edge 21, 22, 23 is defined about a central portion, wherein the central portion is dimensioned to retain a router tool (as shown in FIG. 3, 25) thereon. In the illustrated embodiment, a guide bar 17 is disposed along a first side 18 of the planar body 12, wherein the guide bar 17 abuts an edge of a board (as shown in FIG. 3, 28) or other piece of material to be cut via the associated router tool. In the shown embodiment, the guide bar 17 is parallel to each of the upper and lower edges 21, 22. In the illustrated embodiment, the guide bar 17 extends along a length of the central portion, such that the guide bar 17 comprises a length greater than that of a first elongated opening 13 disposed through the planar body 12. In this manner, the guide bar 17 ensures that the associated router tool is aligned with and stabilized by the edge of the board or other material.

A first elongated opening 13 and a second elongated opening 14 are disposed through the planar body 12, wherein the first and second elongated openings 13, 14 intersect perpendicularly. In this manner, a router bit (as shown in FIG. 3, 26) inserted through each of the first and second elongated openings 13, 14 can be positioned along independent axes. In the shown embodiment, the first and second elongated openings 13, 14 are positioned through the central portion of the planar body 12. In the shown embodiment, the first and second elongated openings 13, 14 intersect perpendicularly at a midpoint of the first elongated opening 13, such that the first elongated opening 13 is divided into two equal portions on opposing sides of the second elongated opening 14. In some such embodiments, the second elongated opening 14 comprises a length equivalent to half of the first elongated opening 13. In this manner, the user can selectively position the router bit along the first and second elongated openings 13, 14. A circular opening 15 is defined at the intersection between the first and second elongated openings 13, 14, wherein the circular opening 15 comprises a diameter greater than a width of each of the first and second elongated openings 13, 14. In this manner, the user can insert the router bit through the circular opening 15 to engage the router bit with the first and second elongated openings 13, 14. Typical router bits include a widened tip relative to the router bit shaft, such that the enlarged diameter of the circular opening 15 can allow the router bit to pass therethrough, whereas the narrower first and second elongated openings 13, 14 prevent the router bit from exiting the first and second elongated openings 13, 14 when engaged therewith.

In the illustrated embodiment, a plurality of measurement indicia 20 are disposed on each of the upper edge 21, the lower edge 22, and each lateral edge 23 of the planar body 12. The plurality of measurement indicia 20 are disposed regularly along each edge 21, 22, 23, wherein the plurality of measurement indicia 20 are contemplated to allow a user to precisely position the router bit within each of the first and second elongated openings 13, 14. In the shown embodiment, the measurement indicia 20 disposed along the upper and lower edges 21, 22 extend along a length of the first elongated opening 13, whereas the measurement indicia 20 disposed along the lateral edges 23 extend along a length of the second elongated opening 14 and the guide bar 17. Furthermore, in the shown embodiment, the measurement indicia 20 define an initial zero measurement indicia in alignment with the circular opening 15, such that all measurements made are defined relative to the position of the circular opening 15. The plurality of measurement indicia 20 are further disposed on each of the first side 18 and a second side 19 of the planar body 12. In this manner, the router guide 11 can be utilized in an inverted position to better function with a table router tool, wherein the second side 19 rests flush against an upper surface of the table router. Alternatively, in combination with a handheld router, the first side 18 rests against the handheld router base (as shown in FIG. 3, 27). The plurality of measurement indicia 20 can be etched, stamped, or printed onto each of the first and second sides 18, 19 of the planar body 12.

Figure 2:
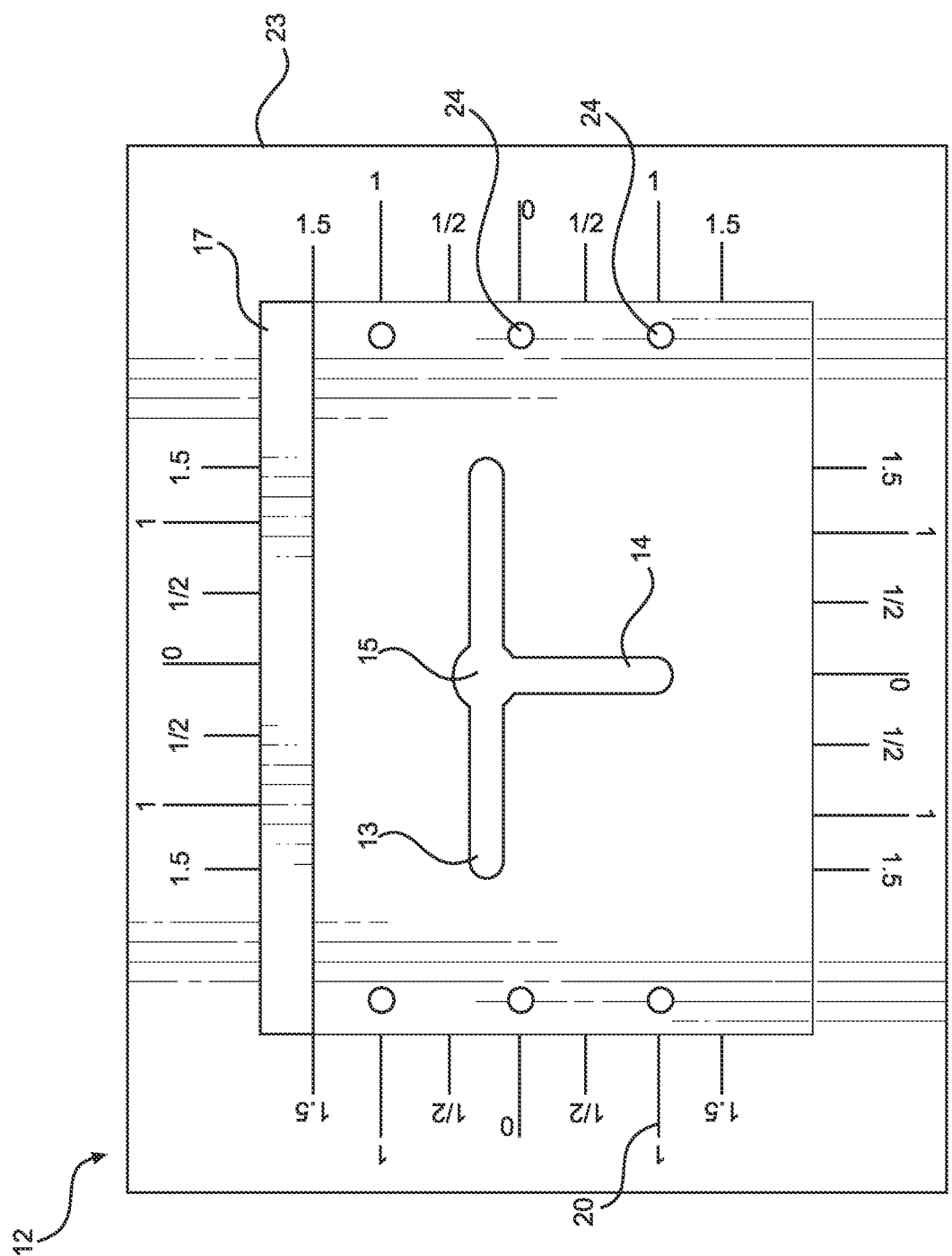
FIG. 2 shows a top plan view of an embodiment of the router guide.

Referring now to FIG. 2, there is shown a top plan view of an embodiment of the router guide. In the illustrated embodiment, the first elongated opening 13 is disposed parallel to the guide bar 17 and comprises rounded opposing ends, wherein the rounded opposing ends are configured to conform to a substantially cylindrical shaft of a router bit. Similarly, in the shown embodiment, a distal end of the second elongated opening 14 comprises a rounded shape. The first and second elongated openings 13, 14 are parallel to and aligned with the plurality of measurement indicia 20 to allow the user to position the router bit more precisely within each of the elongated openings 13, 14. For example, the user can insert the router bit through the circular opening 15 and selectively position the router bit along the second elongated opening 14 to allow the user to cut along a board at a desired depth, or alternatively position the router bit along the first elongated opening 13 to laterally position the router bit relative to the board.

In the illustrated embodiment, a plurality of apertures 24 are positioned along the planar body 12 adjacent to each of the lateral edges 23 thereof. The plurality of apertures 24 are dimensioned to removably secure fasteners or spacers therethrough. In this manner, the user can selectively secure a router to the planar body 12 via the plurality of apertures 24. In the shown embodiment, the plurality of apertures 24 are disposed in two separate rows, wherein the apertures of each row are collinearly aligned along and parallel to the lateral edges 23. The plurality of apertures 24 are contemplated to comprise threading therein to engage complementary threading of the fasteners, or alternatively, be dimensioned to comprise a diameter in close tolerance with a diameter of the fasteners, such that the fastener is frictionally engaged therein. The plurality of apertures 24 are positioned at regular intervals allowing the user to selectively position the router along the planar body 12 in alignment with the plurality of measurement indicia 20. In alternate embodiments, the planar body 12 comprises no apertures therein, wherein the planar body 12 is contemplated to be removably secured to the router tool via a separate clamp.

Referring now to FIG. 3, there is shown an exploded view of an embodiment of the router guide in use. In one use, the router 25 is secured to the planar body 12 by inserting the router bit 26 through the circular opening 15 disposed through the planar body 12. In some embodiments, the user can then insert fasteners through the router base 27 and into the plurality of apertures within the planar body 12, whereas in alternate embodiments, a clamp can be applied to the router base 27 and the planar body 12. In further embodiments, the router bit 26 is retained within the planar body 12 as the router bit 26 comprises a wider tip than a width of the elongated openings, thereby preventing the router 25 from being removed from the planar body 12 while the router bit 26 is positioned along the elongated openings. Once secured, the user can place the planar body 12 on the surface of a board 28 or other material to be cut by the router bit 26 such that an edge of the board 28 abuts the guide bar 17. In this manner, the router 25 can be retained in a position parallel to the edge of the board 28. In an alternate use, the planar body 12 can be inverted for use with a table router, wherein the router bit 26 extends upwards through the circular opening 15. In such uses, the guide bar 17 extends away from the upper surface of the table router allowing the user to rest a board 28 thereagainst. In this manner, the user can ensure that the router bit 26 maintains a position parallel to the edge of the board 28. In one particular use, the user can first mark the board 28 to indicate the position of a desired cut, keyhole, trimming, or other modification to be applied via the router tool 25. The planar base 12 can then be aligned with the marking such that the marking is disposed through the central opening 15. The router bit 26 can then be placed against the board 28 and traverse through the elongated openings in a horizontal or vertical movement as needed to perform the desired cut. As the elongated openings constrain the position of the router bit 26, this ensures a straight cut is made along the board 28. In this manner, the router guide provides users with a cutting guide that allows a user to accurately cut vertical and horizontal holes to install removable trims, baseboards, door frames, chair railings, crown moldings, window frames, windowsills, stairs, and the like to homes and businesses.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A router guide, comprising:
   a planar body having a first elongated opening and a second elongated opening therethrough;
   wherein the first elongated opening perpendicularly intersects the second elongated opening, such that a single T-shaped opening is formed;
   a circular opening having a diameter greater than a width of each of the first and second elongated openings, wherein the circular opening is disposed through the planar body at an intersection of the first and second elongated openings;
   wherein the circular opening is dimensioned to receive a router bit therethrough.

2. The router guide of claim 1, wherein the second elongated opening intersects the first elongated opening at a midpoint thereof.

3. The router guide of claim 1, wherein the first and second elongated openings are disposed centrally along the planar body.

4. The router guide of claim 1, further comprising a guide bar affixed to a first side of the planar body, wherein the guide bar extends parallel to the first elongated opening.

5. The router guide of claim 1, further comprising a plurality of measurement indicia disposed on each of an upper edge, a lower edge, and each lateral edge of the planar body.

6. The router guide of claim 5, wherein the plurality of measurement indicia extends along the upper and lower edge and is disposed exclusively within a length corresponding to a length of the first elongated opening.

7. The router guide of claim 1, wherein a length of the first elongated opening is double a length of the second elongated opening.

8. The router guide of claim 1, wherein the first elongated opening is disposed parallel to an upper edge of the planar body.

9. A router guide, comprising:
   a planar body having a first elongated opening and a second elongated opening therethrough;
   wherein the first elongated opening perpendicularly intersects the second elongated opening, such that a single T-shaped opening is formed;
   a circular opening having a diameter greater than a width of each of the first and second elongated openings, wherein the circular opening is disposed through the planar body at an intersection of the first and second elongated openings;
   wherein the circular opening is dimensioned to receive a router bit therethrough;
   a plurality of apertures disposed through the planar body, wherein the plurality of apertures comprises a pair of colinear rows of apertures disposed parallel to each lateral edge of the planar body.

10. The router guide of claim 9, wherein the second elongated opening intersects the first elongated opening at a midpoint thereof.

11. The router guide of claim 9, wherein the first and second elongated openings are disposed centrally along the planar body.

12. The router guide of claim 9, further comprising a guide bar affixed to a first side of the planar body, wherein the guide bar extends parallel to the first elongated opening.

13. The router guide of claim 9, further comprising a plurality of measurement indicia disposed on each of an upper edge, a lower edge, and each lateral edge of the planar body.

14. The router guide of claim 13, w wherein the plurality of measurement indicia extends along the upper and lower edge and is disposed exclusively within a length corresponding to a length of the first elongated opening.

15. The router guide of claim 9, wherein the plurality of apertures is disposed at regular intervals.

16. The router guide of claim 9, wherein a length of the first elongated opening is double a length of the second elongated opening.

17. The router guide of claim 9, wherein the first elongated opening is disposed parallel to an upper edge of the planar body.

18. The router guide of claim 1, wherein the planar body comprises a plurality of edges defined about a central portion.

19. The router guide of claim 1, wherein the plurality of edges comprise a metallic material having sufficient weight to stabilize the planar body on a cutting surface.

* * * * *